(12) United States Patent
Andrews et al.

(10) Patent No.: US 6,372,188 B1
(45) Date of Patent: Apr. 16, 2002

(54) GAS PROCESSING REACTORS

(75) Inventors: Peter James Andrews, Wantage; Ka Lok Ng, Reading, both of (GB)

(73) Assignee: Accentus plc, Didcot (GB)

( * ) Notice: Subject to any disclaimer, the term of this patent is extended or adjusted under 35 U.S.C. 154(b) by 0 days.

(21) Appl. No.: 09/622,643
(22) PCT Filed: Mar. 5, 1999
(86) PCT No.: PCT/GB99/00647
§ 371 Date: Aug. 21, 2000
§ 102(e) Date: Aug. 21, 2000
(87) PCT Pub. No.: WO99/47243
PCT Pub. Date: Sep. 23, 1999

(30) Foreign Application Priority Data

Mar. 18, 1998 (GB) .............................................. 98 05628

(51) Int. Cl.[7] ................................................ B01J 19/08
(52) U.S. Cl. ...................... 422/186.04; 422/177; 96/122
(58) Field of Search .............................. 422/186.4, 177; 96/122

(56) References Cited

FOREIGN PATENT DOCUMENTS

| GB | 1 354 752 | * | 5/1974 |
| GB | 2 274 412 | * | 7/1994 |

* cited by examiner

Primary Examiner—Kishor Mayekar
(74) Attorney, Agent, or Firm—William H. Holt

(57) ABSTRACT

A reactor for the processing of gaseous media, including two planar beds of active material separated by a gap. A gaseous medium to be processed is fed inwardly around the periphery of the reactor beds into the gap between the reactor beds and collected from their outer surfaces.

5 Claims, 4 Drawing Sheets

GAS PROCESSING REACTORS

CROSS REFERENCE TO RELATED APPLICATIONS

This application is a 35 U.S.C. 371 National Stage filing of PCT/GB99/00647 on Mar. 5, 1999.

REFERENCE TO A MICROFICHE APPENDIX (not applicable)

BACKGROUND OF THE INVENTION

1. Field of the Invention

The present invention relates to reactors for the processing of gaseous media and, more specifically, to reactors for removing nitrogenous and carbonaceous combustion products from the exhaust emissions from internal combustion engines.

2. Description of the Related Art Including Information Disclosed Under 37 CFR. 1.97 and 1.98.

Reactors for removing noxious substances from the exhaust gases from internal combustion engines conventionally have a circular, or at most elliptical cross-section. Examples of such reactors are shown in our patent GB 2,274,412. Other examples are shown in EPO 0 010 384; U.S. Pat. Nos. 4,485,622; 4,427,418 and 4,276,066; EP 0 244 061; EPO 112 634 and EPO 132 166.

Circular cross-section reactors are satisfactory for use with smaller sizes of engines where the volume flow rate of exhaust gas is limited, but for larger engines, such as those of commercial vehicles, the diameter of the reactor becomes excessive, particularly in reactors of the type in which there is a hollow cylindrical bed of active material and the exhaust gases to be treated are caused to flow initially axially into a space between the outside of the bed of active material and the wall of the reactor before being diverted to flow radially through the bed of active material.

Specifications GB 1,296,874, GB 1,354,752, WO 94/12777 and U.S. Pat. No. 5,593,645 disclose reactors for the catalytic treatment of exhaust gases from internal combustion engines. The reactors disclosed in these specifications include a pair of planar gas permeable reactor beds which are disposed symmetrically about the median planes of the reactors. The exhaust gases are admitted to the upstream end of the gap between the reactor beds and pass outwardly therethrough. However, again, the amount of exhaust gases which can be admitted to the gap between the reactor beds is limited by the practicable width of the reactor beds. Also, the rate of outward flow of the exhaust gases varies along the length of the reactor beds resulting in a similar variation in the treatment efficiency of the reactor beds.

It is an object of the present invention to provide a reactor for the processing of gaseous media which is more susceptible to scaling than those used hitherto and which provides for a higher overall treatment efficiency for the gaseous media.

BRIEF SUMMARY OF THE INVENTION

According to the present invention there is provided a reactor for the processing of a gaseous medium, comprising a reactor chamber of rectangular cross-section, two planar reactor beds made of a gas permeable active material, the reactor beds being disposed symmetrically about a median plane of the reactor chamber with a gap therebetween and contained within an outer wall structure, the reactor chamber, the reactor beds and the outer wall structure defining a through gas flow path including the gap between the reactor beds, the reactor beds themselves and gas passages between the reactor beds and the reactor chamber, characterised in that the said wall structure includes a gas feed passage extending around at least a portion of the wall structure and adapted to feed incoming gaseous medium onto the reactor beds transversely of the original direction of flow of the gaseous medium.

Preferably the gas feed passage is adapted to feed incoming gaseous medium to the gap between the reactor beds, the gaseous medium flowing through the reactor beds and being collected from the outer surfaces thereof.

Preferably the two reactor beds are each contained between two perforated metal plates adapted to act as electrodes so that a potential can be applied to the reactor beds sufficient to initiate and maintain a plasma in the gaseous medium as it flows through the reactor beds.

Also there is provided a reactor for the plasma-assisted treatment of the exhaust emissions from internal combustion engines comprising, a reactor chamber of rectangular cross-section, two planar reactor beds made of a gas permeable material having a dielectric constant sufficient to enable a plasma to be excited and maintained in the exhaust gases as they pass through the reactor beds, each reactor bed having a pair of gas permeable electrodes by means of which a potential difference sufficient to excite the said plasma to be applied across the reactor beds characterised in that the reactor beds are disposed parallel to each other symmetrically about the median plane of the reactor chamber and that there is included around the peripheries of the reactor beds a wall structure made of an impervious heat resistant insulating material having a gas passage extending around at least a portion of the wall structure and adapted to admit the exhaust gases to the region between the reactor beds transversely of the original direction of flow of the exhaust gases entering the reactor chamber.

BRIEF DESCRIPTION OF THE SEVERAL VIEWS OF THE DRAWINGS

The invention will now be described by way of example with reference to the accompanying drawings, in which.

DETAILED DESCRIPTION OF THE INVENTION

Figure 1:
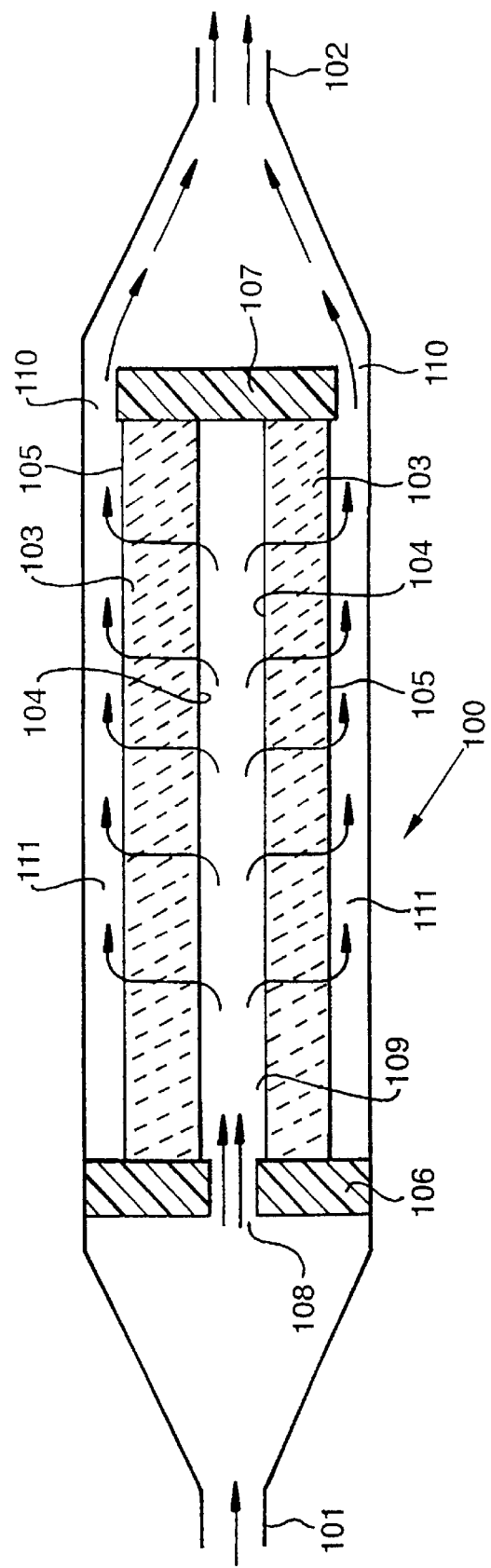
FIG. 1 is a schematic longitudinal section of one embodiment of the invention.

Referring to FIG. 1, a reactor for the processing of a gaseous medium comprises a rectangular reactor chamber 100, the cross-section of which also is rectangular. At one end of the chamber 100 is an inlet stub 101 and at the other end of the chamber 100 is an outlet stub 102. Inside the reactor chamber 100 are two planar reactor beds 103 made up of pellets of an active material adapted to carry out the process for which the reactor is to be used. (The pellets are not shown individually). The pellets which make up the reactor beds 103 are contained between two sets of perforated stainless steel reactor bed retainers 104 and 105 and end plates 106 and 107, into which the reactor bed retainers 104, 105 are housed. Similar plates support the longitudinal edges of the reactor bed retainers 104, 105. The end plate 106 nearer the inlet stub 101 of the reactor chamber 100 is sealed to the wall of the reactor chamber 100 at its edges but has a central slot 108 which admits incoming gas to a space 109 between the two reactor beds 103. The end plate 107 on the other hand, has two gas passages 110 at its outer edges. Gas which initially enters the space 109 between the reactor beds 103 longitudinally is constrained to pass transversely through the reactor beds 103 and emerge into a space 111 between the outer reactor bed retainers 105 enclosing the reactor beds 103 and through the gas passages 110 before leaving the reactor chamber 100 via the outlet port 102.

If the reactor is to be used for the plasma assisted processing of a gaseous medium, such as the exhaust emissions from an internal combustion engine, then the supporting plates must also be insulating, suitable materials being ceramics, and the pellets in the reactor beds 103 must have dielectric constants sufficient to enable a plasma to be excited and maintained in the gaseous medium as it passes through the reactor beds 103. Suitable materials for use in the reactor beds 103 are mixed metal oxides or titanates. Also a suitable connection must be made to one of each pair of stainless steel reactor bed retainers 104, 105, the other being earthed. For obvious reasons, the inner stainless steel reactor bed retainers 104 are used as the high voltage electrodes.

In the basic apparatus described above, there is only a central slot 108 in the ceramic plate 106 to admit gas to the space 109 between the reactor beds 103. In accordance with the invention a configuration is used in which the ceramic side support plates have open section gas passages formed in them. The end support plate 107 also can be formed to have an open gas feed channel which communicates with those of the side ceramic support plates. Such an arrangement is shown in FIG. 3, to be described later.

Figure 2:
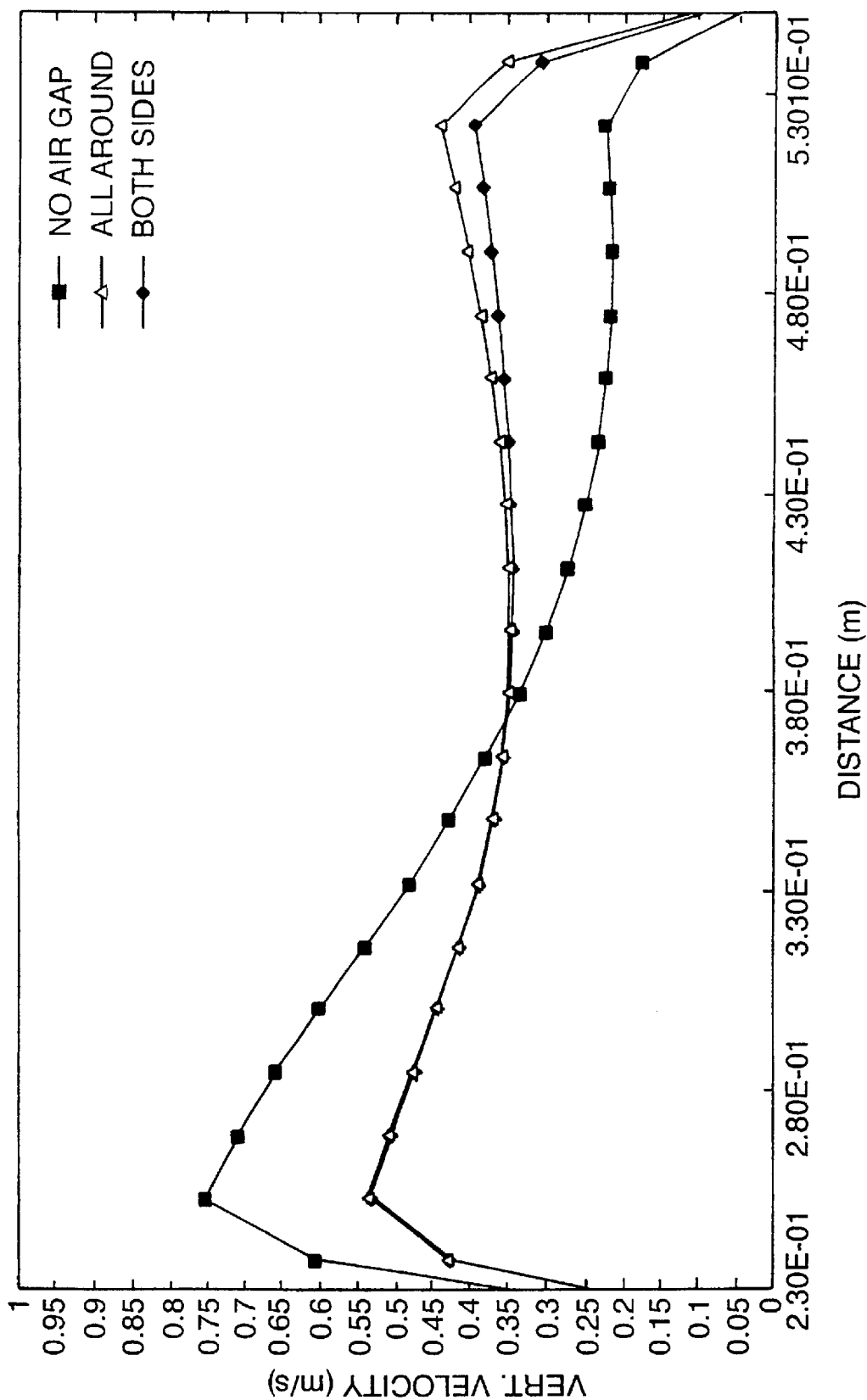
FIG. 2 is a gas flow diagram for a reactor such as that of FIG. 1 but with different gas flow arrangements.

FIG. 2 shows gas flow diagrams for a reactor of the above-described type in each of the three configurations mentioned above. It can be seen that the provision of the extra gas passages around the sides and rear of the reactor beds produces a more consistent outward flow of gas through the reactor beds 103 than occurs if the incoming gas is fed through the slot 108 in the ceramic plate 106 only and hence provides a more consistent treatment of the gases passing through the reactor.

Figure 3:
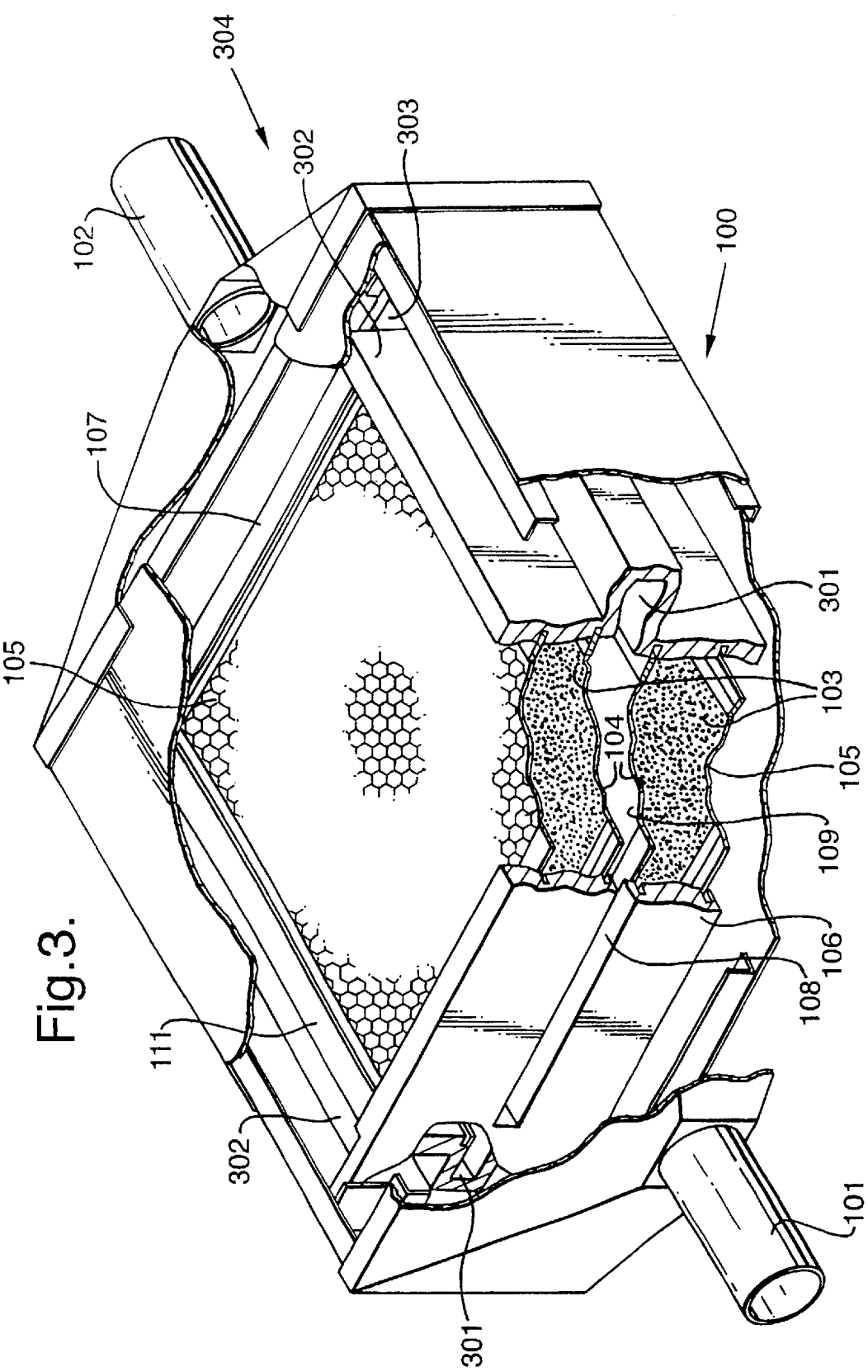
FIG. 3 is a schematic part sectional view of an embodiment of the invention.

FIG. 3 is a part cut away view of a practical gas reactor embodying the present invention. Those components which correspond with similar components of the reactor described with reference to FIG. 1 have the same reference numerals.

Referring to FIG. 3, in general, the construction is as described with relation to FIG. 1. Only the upper outer reactor bed retainer 105 is shown in detail. Its honeycomb structure is evident. FIG. 3, however, shows clearly the gas feed passages 301 in the side support plates 302. Also the top surface of a rear gas feed passage 303 is just visible in the top right corner 304 of the reactor chamber 100.

Figure 4:
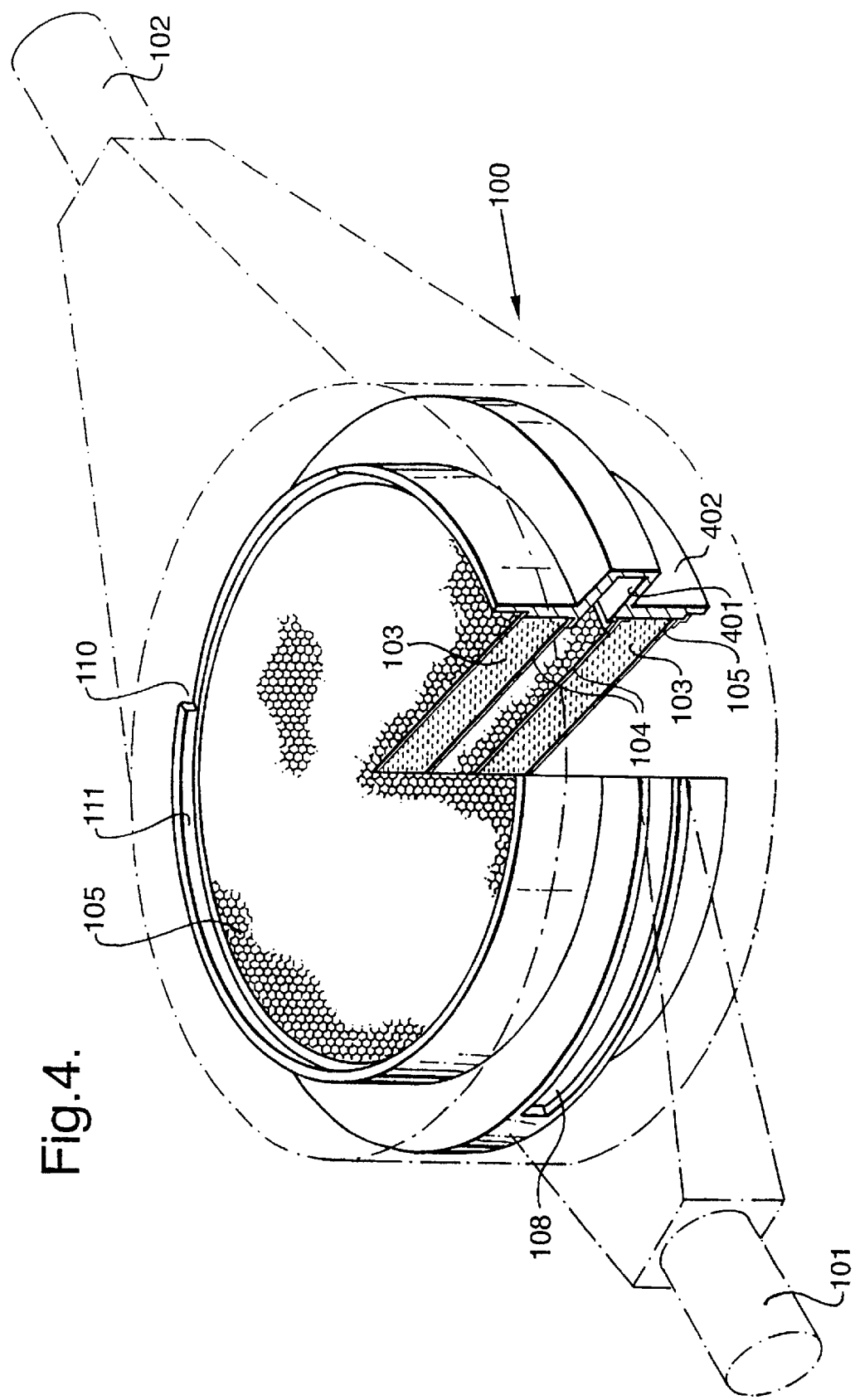
FIG. 4 is a part sectional view of a second embodiment of the invention.

FIG. 4 shows another embodiment in which the reactor beds are circular in plan. As before, those components which correspond with similar components of the reactor described with reference to FIG. 1 have the same reference numerals. In this embodiment of the invention the plan form of the beds 103 of active material is circular, but the gas flow pattern is the same as before; the incoming gaseous medium to be processed passes directly through the entrance slot 108 into the space 109 between the reactor beds 103, and outwardly through the reactor beds 103 and outer reactor bed retainers 105 before passing through the gaps 110 to the outlet 102 from the reactor 100. In addition the incoming gaseous medium passes around the annular open passage 401 which is formed in the cylindrical member 402 which supports the inner and outer reactor bed retainers 104 and 105 and also retains the reactor bed material laterally before also entering the gap between the reactor beds 103.

As with the embodiment of the invention described with reference to FIG. 1, the FIG. 3 and FIG. 4 embodiments can be used for the processing of gaseous media generally, or for the treatment of the exhaust emissions from internal combustion engine specifically, with or without the assistance of a plasma established in the gaseous medium to be processed as it passes through the reactor beds 103.

If either of the reactors described above with reference to FIGS. 3 and 4 is used for the plasma assisted processing of gaseous media then the outer reactor bed retainers 105 are connected to an earthing point and the inner reactor bed retainers are connected to a high voltage feed through connector mounted in the casing of the reactor 100. Also, if the reactors are to be used for the plasma assisted processing of internal combustion engine exhaust emissions, then a suitable material for the reactor beds 103 is a metal oxide material such as barium titanate or a mixed metal oxide material.

What is claimed is:

1. A reactor for the processing of a gaseous medium, comprising a reactor chamber of rectangular cross-section, two planar reactor beds made of a gas permeable active material, said reactor beds being disposed symmetrically about a median plane of said reactor chamber and spaced apart for defining a gap therebetween and contained within an outer wall structure; said reactor chamber, said reactor beds and said outer wall structure defining a through gas flow path including said gap between said reactor beds, said reactor beds themselves and gas passages between said reactor beds and said reactor chamber, wherein said wall structure includes an inlet gas feed passage extending around at least a portion of said wall structure for feeding incoming gaseous medium into said gap between said reactor beds in a direction transverse to both the original direction of flow of the gaseous medium and the direction in which the gaseous medium flows through said reactor beds.

2. A reactor according to claim 1, wherein the wall structure is made of a ceramic insulating material and the reactor beds are contained within inner and outer electrically conducting gas permeable retaining members, respectively, said retaining members acting as electrodes by means of which there may be applied across the reactor beds a potential sufficient to excite an electric discharge in the gaseous medium passing through the reactor beds.

3. A reactor according to claim 2, for the plasma-assisted treatment of the exhaust emissions from internal combustion engines, wherein the gas permeable material of the reactor beds has a dielectric constant sufficient to enable a plasma to be excited and maintained in the exhaust bases as they pass through the reactor beds, and the wall structure comprises an impervious heat resistant insulating material.

4. A reactor according to claim 3, wherein the reactor beds are made of a metal oxide material.

5. A gas reactor according to claim 1, wherein the reactor beds are circular in plan.

* * * * *